United States Patent
Giamberini et al.

(10) Patent No.: US 9,751,162 B2
(45) Date of Patent: Sep. 5, 2017

(54) REGENERATION SYSTEM FOR A FORGE DIE

(75) Inventors: Luca Giamberini, Gornate Olona (IT); Andrea Tonoli, Lainate (IT)

(73) Assignee: NEWELD S.A., Balerna (CH)

( * ) Notice: Subject to any disclaimer, the term of this patent is extended or adjusted under 35 U.S.C. 154(b) by 609 days.

(21) Appl. No.: 14/234,947

(22) PCT Filed: Aug. 3, 2011

(86) PCT No.: PCT/IT2011/000285
§ 371 (c)(1),
(2), (4) Date: Feb. 5, 2014

(87) PCT Pub. No.: WO2013/018114
PCT Pub. Date: Feb. 7, 2013

(65) Prior Publication Data
US 2014/0172147 A1 Jun. 19, 2014

(51) Int. Cl.
*B23P 6/00* (2006.01)
*B23K 9/04* (2006.01)
*B21K 5/20* (2006.01)

(52) U.S. Cl.
CPC ...... *B23P 6/00* (2013.01); *B21K 5/20* (2013.01); *B23K 9/04* (2013.01)

(58) Field of Classification Search
None
See application file for complete search history.

(56) References Cited

U.S. PATENT DOCUMENTS

| | | |
|---|---|---|
| 6,274,839 B1 | 8/2001 | Stone et al. |
| 6,940,037 B1 | 9/2005 | Kovacevic et al. |
| 2009/0205752 A1* | 8/2009 | Kumaki .............. B21K 1/762 148/210 |
| 2010/0152870 A1* | 6/2010 | Wanner .............. B23K 9/0256 700/97 |

FOREIGN PATENT DOCUMENTS

| | | |
|---|---|---|
| CN | 101927391 | 12/2010 |
| DE | 19623148 | 1/1998 |
| EP | 1005941 | 6/2000 |

OTHER PUBLICATIONS

Hu, Y, et al, "Method for performing automatic surfacing repair on damaged metal part", Database WPI, Week 201111, Thomson Scientific, London GB, AN 2011-B25008, XP002675388, Dec. 29, 2010, 1 page.

* cited by examiner

*Primary Examiner* — Umut Onat
(74) *Attorney, Agent, or Firm* — Pearne & Gordon LLP (57) ABSTRACT

A regenerating system for a forge die (1) according to the invention comprises a detecting device (10) of a shape (2) of a die (1) to be regenerated, a welding system (30) configured such as to deposit welding material in the die (1), and a processor (20) configured such as to define welding pathways (11) in order to activate the welding system (30), wherein the welding pathways (11) are defined according to the shape (2) detected and a predefined shape of the die (1).

17 Claims, 7 Drawing Sheets

REGENERATION SYSTEM FOR A FORGE DIE

FIELD OF APPLICATION

The present invention relates to a regeneration system for dies.

In particular, the present invention concerns a regeneration system for forge dies that have been worn by repeated use and the description that follows makes reference to this field of application.

PRIOR ART

In normal production processes for forge dies, the dies are used up until the shape of the die is worn and no longer enables production of the pieces with sufficient satisfactory qualitative characteristics.

To prevent the dies worn by repeated use from being stored or treated as waste material, with a considerable economic expense and serious damage to the environment, they are regenerated.

As is well known, in traditional regeneration processes, all the worn surface is removed from the used dies by means of a manual process known as scarfing.

The layer to be removed has a variable thickness on the basis of the type of die and, in any case, is not constant over the whole surface, either because it is a manually performed operation or because in the zones of greatest use, of difficult access or in the presence of scarf, a greater quantity of material is removed.

Following the scarfing, the die is manually welded and the quantity of material deposited has to be sufficient to cover the whole profile area of the new die.

The final operation is mechanical working of the welded die which, by removing the excess welding material, completely regenerates the profile of the original die.

Figure 1:
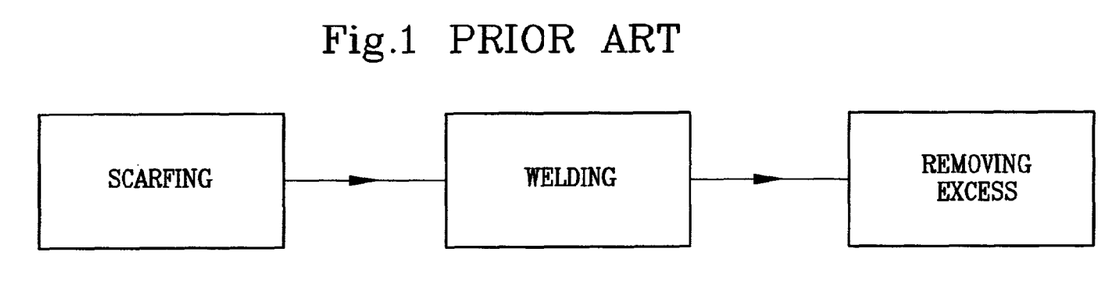
FIG. 1 shows a generic block diagram of the various steps of a regeneration process of a forge die according to the prior art.

As can be noted, the traditional process (schematically illustrated in FIG. 1) is substantially manual and as such is susceptible to a series of drawbacks connected to a precision of the final product which is dictated by professional skill rather than by predefined process steps.

The aim of the present invention is to provide a regeneration system for forge dies which can guarantee optimal quality of the regenerated die.

A particular aim is to provide a regeneration system for forge dies which enables optimal depositing of the welding material.

SUMMARY OF THE INVENTION

These and other aims besides are attained by a regeneration system for forge dies, according to what is set out in the accompanying claims.

The regeneration system for forge dies, according to the invention, attains the following principal technical effects with respect to the prior art:
  depositing a homogeneous and precise welding layer;
  a consequent saving of welding material and a reduction of the costs of mechanical working;
  an increase in quality and repeatability of the welding process, with a consequent reduction in costs due to defects and lack of material in some zones;
  working conditions that are less dangerous for the health due to the use of automated means in the welding operation.

These and other technical effects of the invention will emerge in more detail from the description, provided for in the following, of an example of an embodiment thereof, given by way of an indicative, non-limiting example with reference to the accompanying figures of the drawings.

DETAILED DESCRIPTION

A regeneration system for forge dies according to the invention comprises a detecting device of a shape of a die to be regenerated, a welding apparatus suitable for depositing welding material in the die in order to regenerate it, and a processor configured such as to define welding pathways for activating the welding apparatus, in which the welding pathways are defined as a function of the detected shape and a predefined shape of the die.

In regenerating processes of dies the first operation to be realised is the removal of material from the die to be regenerated.

Even today this removal operation is realised manually (the so-called scarfing operation) because any available automated systems for removing material (for example milling) do not give sufficiently reliable results, and are slow and expensive.

A die is considered to comprise a block 5 and a "figure" 6 of the piece to be moulded.

Figure 6:
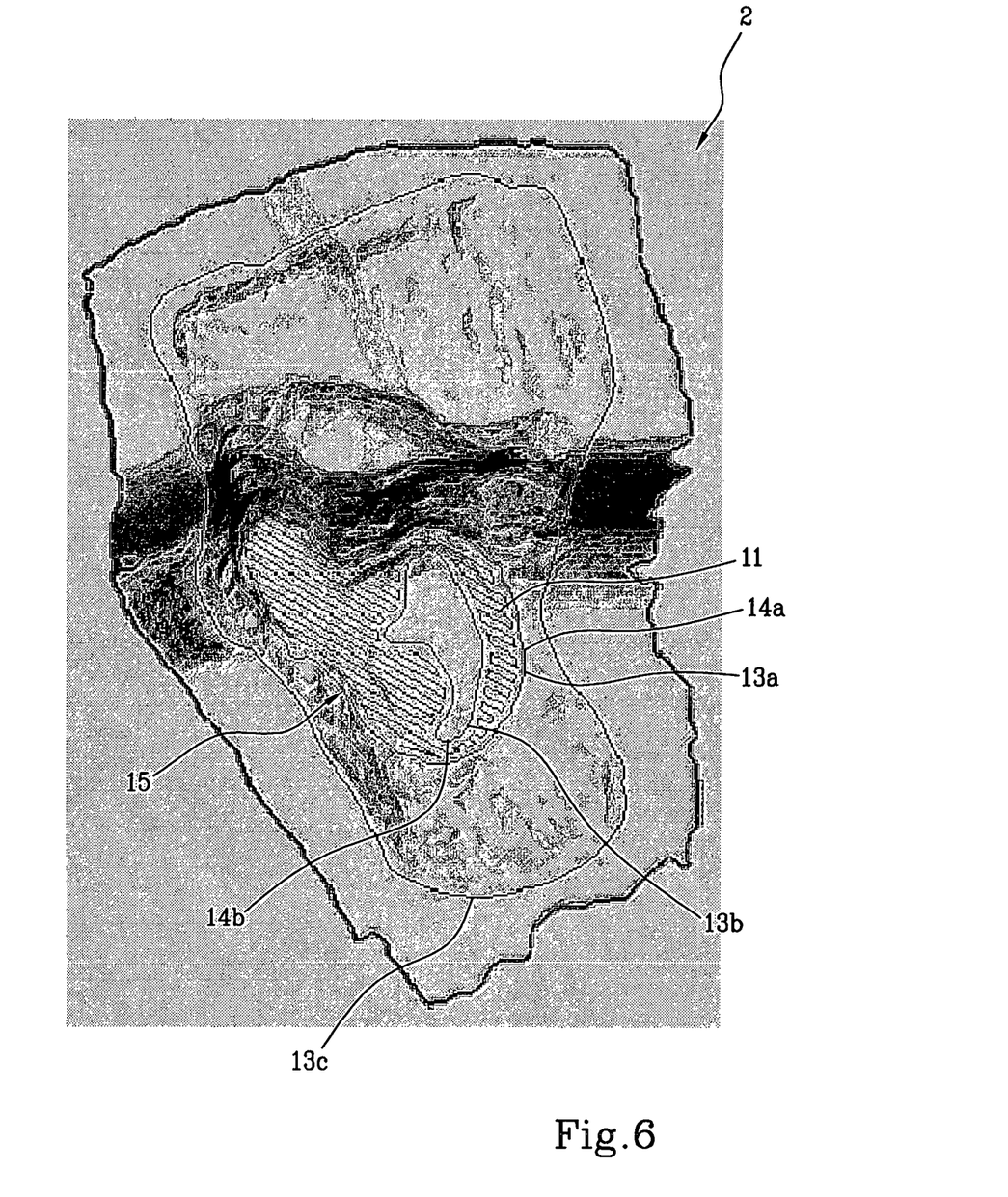
Figure 7:
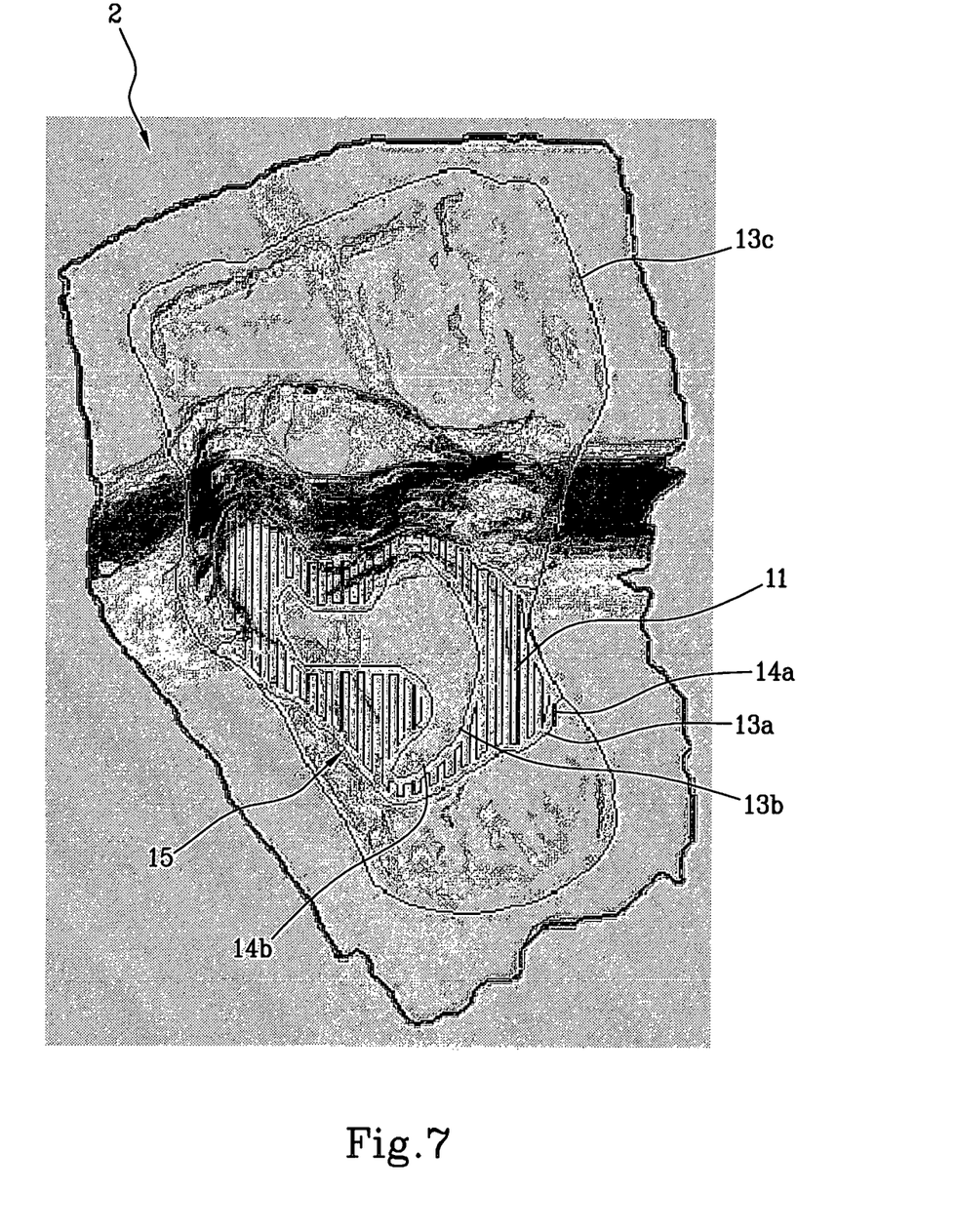

The FIG. 6 can comprise a recess or a portion in relief.

The FIG. 6 represents the shape of the die to be regenerated.

Figure 2:
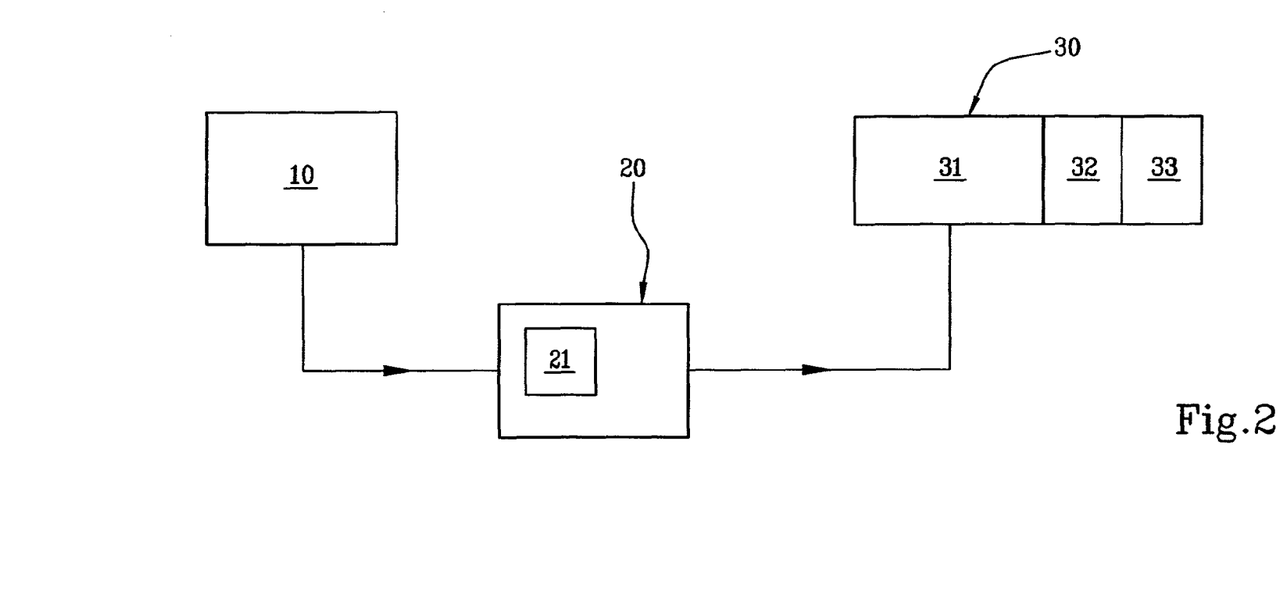
FIG. 2 shows a block diagram of the regeneration system of a forge die according to the invention.
Figure 4:
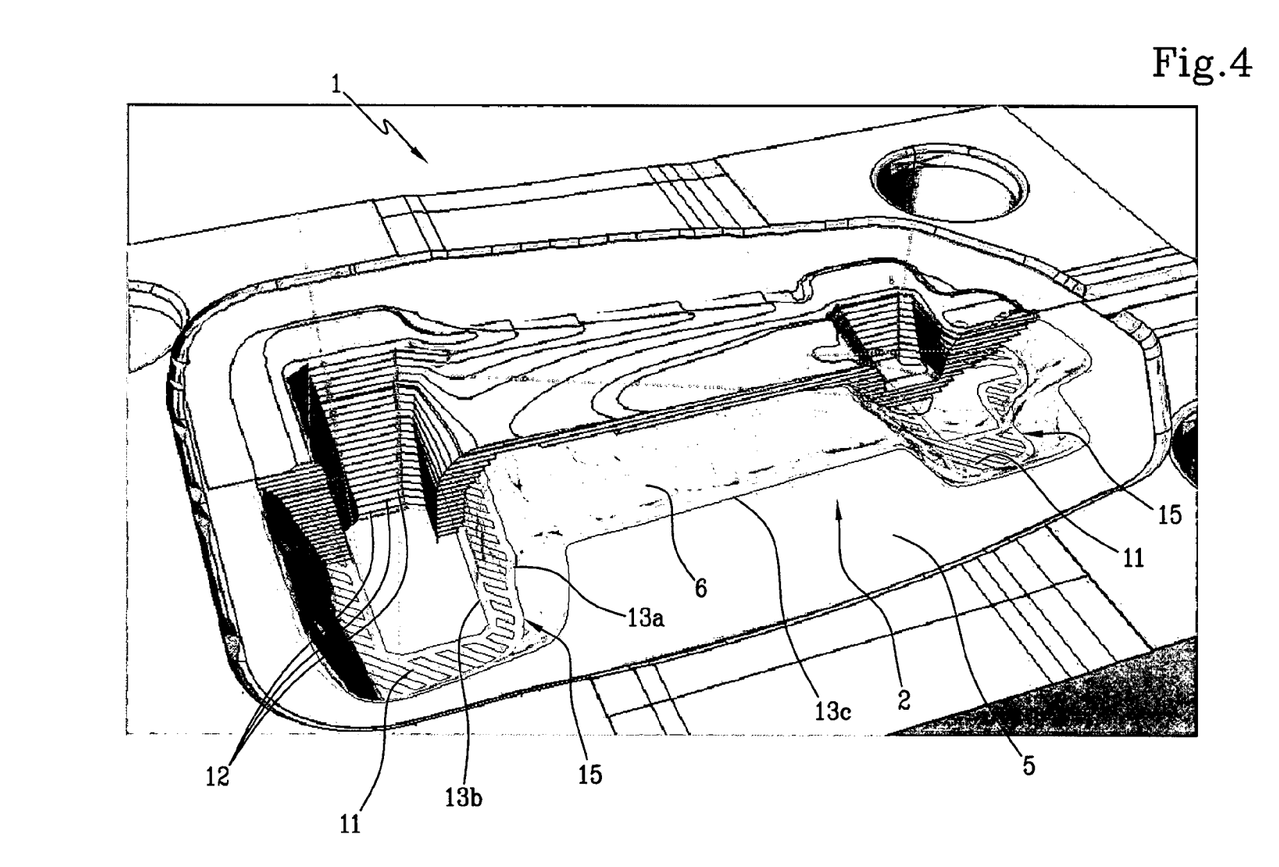
FIG. 4 is an assembled view of a target die and regeneration sections of a die to be regenerated.

With reference to FIGS. 2 and 4, a die regenerating system, according to the invention, which intervenes after the material removal operation, comprises a detecting device 10, for acquiring a shape 2 of a die 1 to be regenerated.

In particular, the regenerating system for dies intervenes after a scarfing operation.

In other words, the detecting device 10 acquires the shape 2 of the die to be regenerated in order to realise a 3D model of the shape.

The detecting device 10 is preferably a three-dimensional scanning system.

The scanning system is preferably a laser scanner.

The regenerating system of the invention further comprises a welding system 30 (FIG. 2).

The welding system 30 is suitable for depositing welding material in the shape 2 detected by the detecting device 10.

In particular, the welding system 30 comprises movement means 31 and a welding apparatus 32 associated to the welding torch 33.

The movement means 31 are configured such as to move the welding torch 33.

In other words the movement means 31 are configured such as to displace and orient the welding torch 33.

The movement means 31 preferably comprise an anthropomorphic robot having six or more axes.

The welding torch 33 preferably realizes a Metal Inert Gas (MIG) pulse-arc welding.

According to the invention, the regenerating system further comprises a processor 20 (FIG. 2) connected to the detecting device 10 and to the welding system 30.

The processor 20 is preferably a personal computer.

According to the invention, the processor 20 is configured such as to define welding pathways 11 (FIGS. 4-8) for the welding system 30.

The processor 20 is configured such as to define the welding pathways 11 as a function of the shape 2 of the die 1 detected by the detecting device 10.

Further, the processor 20 is configured such as to define the welding pathways 11 as a function of the predefined shape of the die.

According to the invention, the processor comprises a control unit 21 (FIGS. 2 and 3) configured such as to control the welding operations of the welding system 30.

In general, note that the present description and in the following claims, the control unit 21 will be presented as sub-divided into distinct functional modules (memory modules or operating modules) with the sole aim of describing the functions thereof clearly and completely.

In reality, the control unit 21 can be constituted by a single electronic device, specially programmed such as to perform the described functions, and the various modules can be hardware and/or software routine programs which are part of the programmed device. Alternatively or additionally, these functions can be carried out by a plurality of electronic devices on which the functional modules can be distributed.

The control unit 21 can further use one or more processors for carrying out the instructions contained in the memory modules.

The control unit 21 can further be centralized or distributed according to the architecture of the network it is located in.

Figure 3:
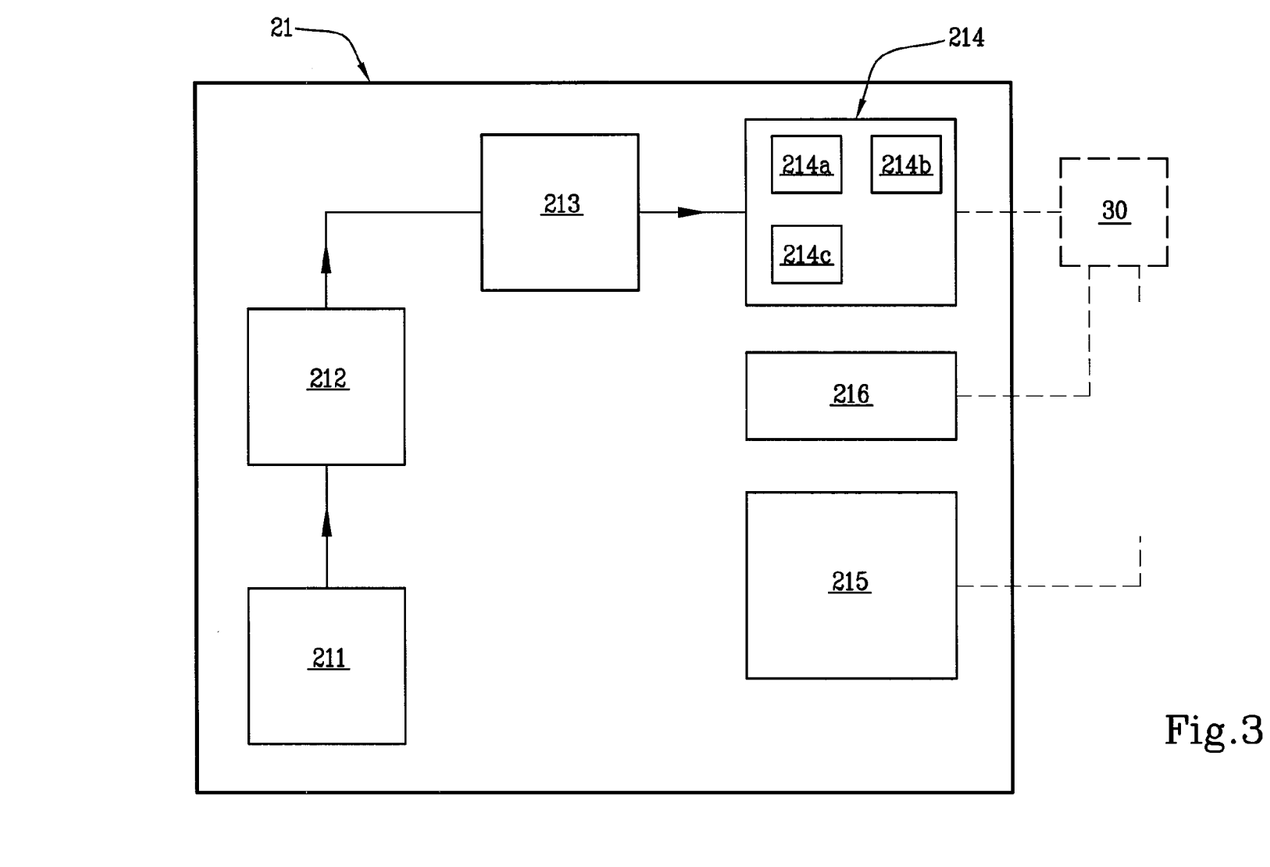
FIG. 3 shows a block diagram of the control unit of the system of FIG. 2.

The control unit 21, according to the invention, comprises a sectioning module 211 (FIG. 3).

The sectioning module 211 is configured such as to horizontally section the 3D model of the shape 2 detected defining a plurality of virtual surfaces 12 (FIG. 4) that are at least partially superposed.

In other words, the sectioning module 211 is configured such as to section the 3D model of the shape 2 into parallel sections, from the deepest portion of the die up to a section coinciding with the upper end of the die to be reproduced.

In other words, the sections are portions of planes which exhibit a same lie.

The sections are preferably portions of planes arranged horizontally (FIG. 4).

In other words, the sections are portions of planes that are orthogonal to the direction of the gravity acceleration vector g.

The control unit 21 according to the invention comprises a comparison module 212 (FIG. 3).

The comparison module 212 is configured such as to compare surfaces representative of a predefined shape of the die 1 to be realised, with the corresponding virtual surfaces 12 defined in such a way as to define welding surfaces 15.

In other words, the comparison module 212 compares the model of the die to be realised with the model of the scarfed die in order to evaluate which zones of the die need to be regenerated.

In order to perform this comparison, the model of the die to be realised and of the scarfed die have been obtained using the same criterion; in other words the defining parameters of the sections/surfaces derive from a same mathematical model. This guarantees, for example, that the distances in terms of height between a section/surface detected from the scarfed die coincide with the predefined distances of the die to be realised.

In other words, the welding surfaces 15 represent the missing zones in the scarfed die in relation to the predefined die. These zones, therefore, require regenerating.

The technical effect achieved is to redeposit the welding material only where there is not already present a sufficient thickness in the die to be regenerated 1.

In other words, the depositing of the welding material is guaranteed only where regeneration is required.

In detail three scenarios are possible:

a)

Figure 5:
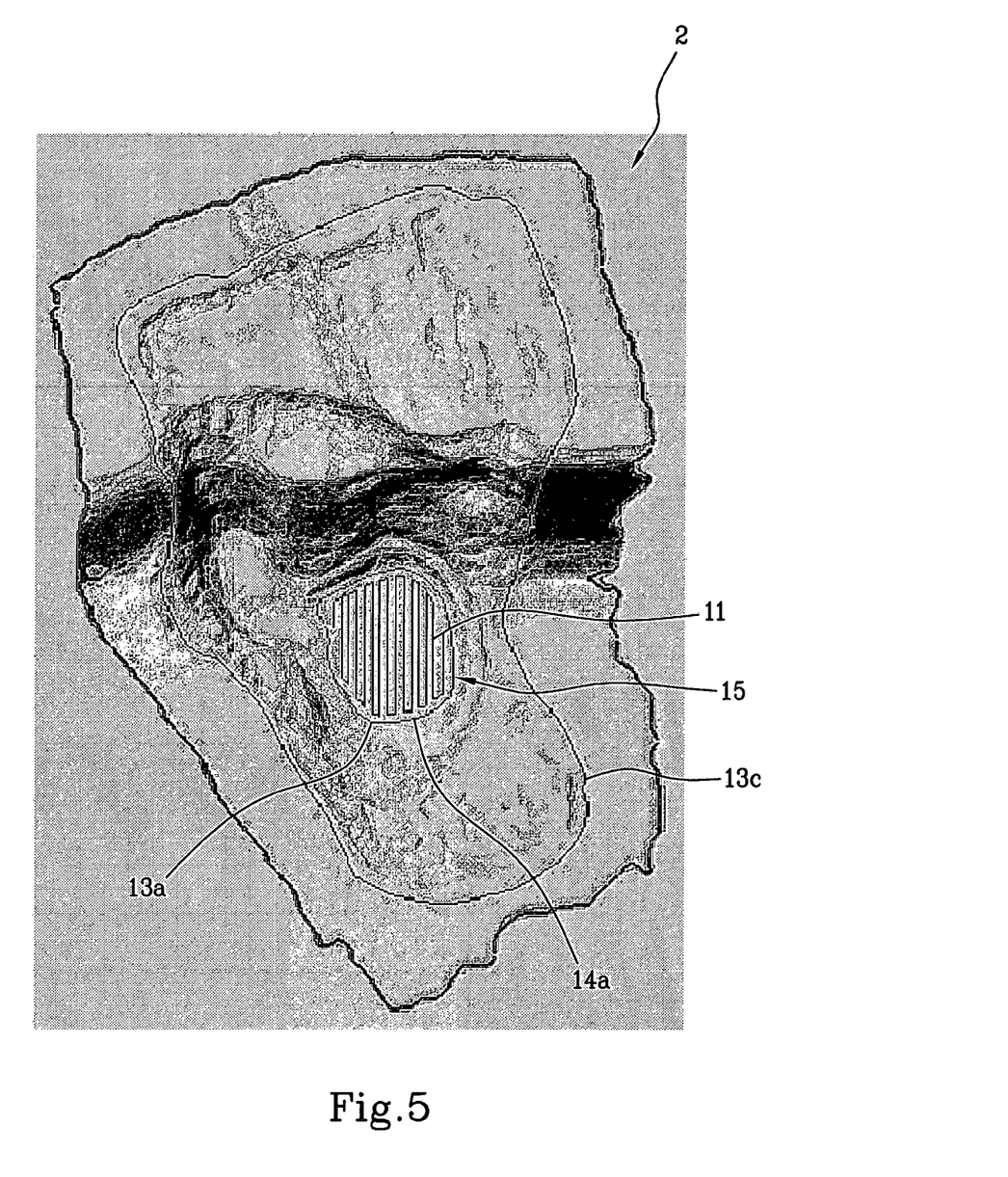
FIGS. 5-8 show examples of regeneration of a die realised with the system of FIG. 2.
Figure 8:
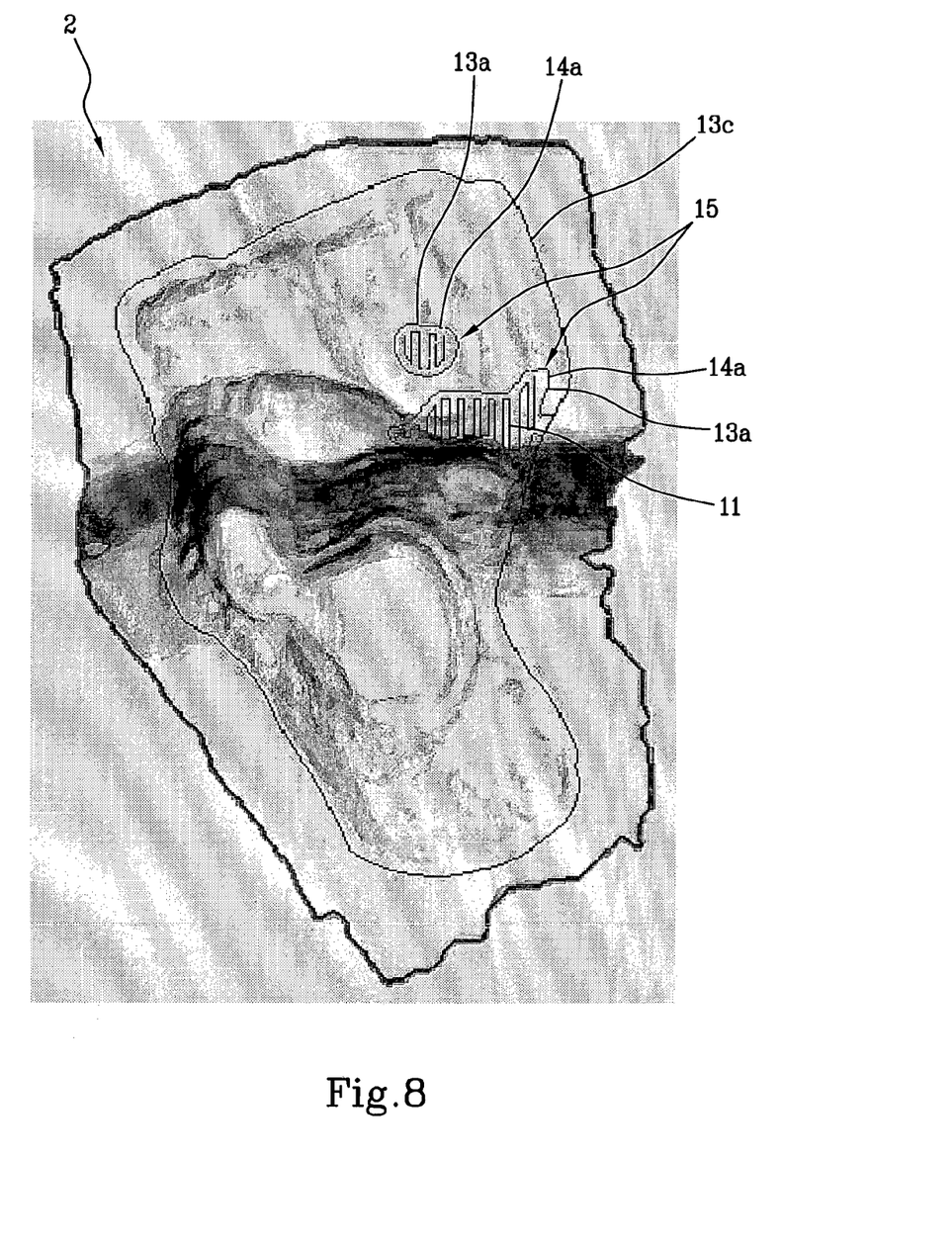

From the comparison performed by the comparison module 212 between surfaces representative of a predetermined shape of the die 1 to be realised and the corresponding virtual surfaces 12 defined, it is seen that the considered virtual surface 12 does not have points in common with the target die because the target die is at a greater height (FIGS. 5 and 8).

This is the case in which there is a "hole" in the shape 2 detected (FIG. 5) or where material is missing which should define a "protuberance" emerging from the detected shape 2 (FIG. 8).

The regeneration is obtained by filling the hole or recreating the protuberance in order to obtain the desired die.

In this case, according to the comparison performed, the comparison module 212 is configured such as to define a first delimiting line 13a of the welding surface 15.

The delimiting line 13a coincides with the perimeter of the hole at the height involved. This line 13a bounds the welding surface 15 to be regenerated.

b)

From the comparison performed by the comparison module 212 between surfaces representative of a predefined shape of the die 1 to be realised and the corresponding virtual surfaces 12 defined, it emerges that the virtual surface 12 of the shape 2 has points in common with the target die as the considered surface of the target die is at the same height as the virtual surface 12 (FIG. 4).

In this case, according to the comparison performed, the comparison module 212 is configured such as to define a first delimiting line 13a and a second delimiting line 13b of the welding surface 15.

Two delimiting lines 13a, 13b are closed and concentric and the corresponding crown represents a welding surface 15.

c)

In this case, the welding surface 15 is obtained in a similar way to that of the preceding case, with the sole difference being that the outer delimiting line between the first 13a and the second 13b delimiting line partially coincides with a supplementary line 13c (FIGS. 4-8).

The supplementary line 13c is a perimeter delimiting line configured such as to prevent the welding from exiting from the "figure" 6 of the die to be regenerated.

More in general, the curve 13c serves to delimit the zone of the die which is to be regenerated.

This line 13c can coincide with a delimiting line of the scarfed zone at the height of the block 5 of the die.

In general terms, it can be understood that at the same height the cases described in points a), b) and c) can be presented singly or in any combination.

In general, from the described cases, the comparison module 212 is configured such as to define at least a delimiting line 13a, 13b of the welding surfaces 15 as a function of the comparison between the model of the die to be realised and the model of the scarfed die.

According to the invention, the control unit 21 comprises a bordering module 213 (FIG. 3).

The bordering module 213 is configured such as to determine a first depositing of a layer of welding along the at least a delimiting line 13a, 13b, thus defining at least a containing border 14a, 14b of welding.

According to the invention, the control unit 21 further comprises a filling module 214 (FIG. 3).

The filling module 214 is configured such as to determine a depositing of welding within the at least one of the delimiting lines 13a, 13b.

According to the invention, the filling module 213 is configured such as to determine the depositing, internally of at least a containing edge 14a, 14b, by a zigzag welding pathway 11 (FIGS. 4-8).

The technical effect achieved is the efficient depositing of the layer of welding.

Thus the welding deposits cover the surface to be welded with a constant thickness of welding.

In particular, the filling module 214 is configured such as to determine depositing of welding in the welding surfaces 15 internally of at least a containing border 14.

According to the invention, the filling module 214 comprises a first control module 214a (FIG. 3).

The first control module 214a is configured such as to determine welding pathways 11 which do not superpose within the at least a delimiting line 13a, 13b, thus obtaining a constant thickness of the welding.

The technical effect achieved is the depositing of a layer of welding that is homogeneous and precise.

According to the invention, the filling module 214 comprises a second control module 214b.

The second control module 214b is configured such as to determine depositing of welding in a single advancement direction along welding pathways 11 of a same welding surface 15.

The technical effect achieved is that it is impossible for the welding system 30 to pass more than once along the same pathway, thus preventing the creation of undesired welding thicknesses.

According to the invention, the filling module 214 comprises a third control module 214c.

The third control module 214c is configured such as to determine depositing of welding in different advancement directions on welding pathways 11 of successive welding surfaces 15.

In particular the control module 214c is configured such as to vary the advancement directions according to predefined angles of variation.

The technical effect achieved is an equal distribution on the welding surfaces of the start-welding zones which typically exhibit a slimmer deposited thickness, such that the superposing of the welding zones which determines the final product guarantees as constant a distribution of the welding material as possible.

According to the invention, the control unit 21 further comprises an entry module 216 (FIG. 3).

The entry module 216 is configured for an entering of data representing the supplementary line 13c configured such as to delimit the shape 2 of the die to be regenerated.

The supplementary line 13c coincides with a perimeter border of the "figure" 6 of the die 1, the "figure" 6 being at least partially complementary to the shape 2.

According to the invention, the processor 20 is further configured for kinematic simulation on the robot which will be carrying out the work.

In particular, the control unit 21 comprises a movement module 215 (FIG. 2) configured such as to simulate the movements of the movement means 31 for defining the welding pathways 11.

In other words, once the welding surfaces 15 are defined, the movements of the movement means 31 have to be simulated in order to prevent any parts of the welding pathways 11 from being unreachable by the robot due to mechanical constructional constraints of the same robot, and to prevent any possibility of collisions with any moving apparatus and with the die.

Once the simulation has been performed, the most suitable movements for the movement means 31 are defined.

The movement module 215 is configured such as to translate the movements defined by the simulation into command instructions for the movement means 31 during the welding operations.

In other words, the movement module 215 is configured for translating the welding pathways reachable by the movement means into corresponding instructions for the movement means used.

The instructions are preferably constituted by a code for the above-cited robot.

From the above it can be seen how the system of the invention functions.

The die is first scarfed and the corresponding shape is detected by a 3D laser scanner.

Then the detected shape is compared with the shape of the die which is the target of the regeneration.

The welding material is deposited according to criteria of homogeneity and welding efficiency, in zones of the die that are obtained from the comparison, in order to obtain a regenerated die.

What is claimed is:

1. A regeneration system for a forge die, comprising:
a detecting device for 3D detecting of a shape of said die to be regenerated;
a welding system adapted to deposit welding material in the detected shape;
a processor connected to said detecting device and to said welding system, wherein said processor is configured to define welding pathways for said welding system according to the shape detected, the processor comprising a control unit adapted to:
section a 3D model of said detected shape on parallel surfaces, said sectioning defining a plurality of virtual surfaces at least partially superposed;
compare surfaces representative of a predefined shape of said die with said corresponding virtual surfaces, to define welding surfaces which represent the missing zones in the scarfed die in relation to the predefined die;
define at least a delimiting line of said welding surfaces according to said comparison;
determine a depositing of welding within said at least a delimiting line, wherein said depositing is realised by means of a zigzag welding pathway;
determine a first depositing of a welding layer along said at least a delimiting line, thus defining at least a containing border of welding;

and said filling module being configured to determine said depositing of welding in said welding surfaces internally of said at least a containing border.

2. The system according to claim 1, wherein said control unit is adapted to determine welding pathways without any superposing within said at least a delimiting line, thus obtaining a constant thickness of the welding.

3. The system according to claim 2, wherein said control unit is adapted to determine welding depositing along a sole advancement direction on welding pathways of a same welding surface.

4. The system according to claim 2, wherein said control unit is adapted to determine welding depositing in various advancement directions on welding pathways of successive welding surfaces, thus equally distributing the welding material in said die.

5. The system according to claim 1, wherein said control unit is adapted to determine welding depositing along a sole advancement direction on welding pathways of a same welding surface.

6. The system according to claim 1, wherein said control unit is adapted to determine welding depositing in various advancement directions on welding pathways of successive welding surfaces, thus equally distributing the welding material in said die.

7. The system according to claim 1, wherein said control unit is adapted to enter data representing a supplementary line configured to delimit a zone of the die which is to be regenerated.

8. The system according to claim 7, wherein said supplementary line coincides with a perimeter edge of a "figure", said "figure" being at least partially complementary to the shape.

9. The system according to claim 1, wherein said control unit is adapted to simulate movements of said movement means for defining said welding pathways.

10. The system according to claim 9, wherein said control unit is adapted to translate said movements into instructions for said movement means.

11. The system according to claim 1, wherein said welding system comprises movement means and a welding apparatus associated to a welding torch, said movement means being configured for moving said welding torch.

12. The system according to claim 11, wherein said movement means comprise an anthropomorphic robot having six or more axes.

13. The system according to claim 1, wherein said detecting device comprises a three-dimensional scanner.

14. The system according to claim 1, wherein said control unit is adapted to determine welding pathways without any superposing within said at least a delimiting line, thus obtaining a constant thickness of the welding.

15. The system according to claim 14, wherein said control unit is adapted to determine welding depositing along a sole advancement direction on welding pathways of a same welding surface.

16. The system according to claim 1, wherein said control unit is adapted to determine welding depositing along a sole advancement direction on welding pathways of a same welding surface.

17. The system according to claim 1, wherein said control unit is adapted to determine welding depositing in various advancement directions on welding pathways of successive welding surfaces, thus equally distributing the welding material in said die.

* * * * *